United States Patent

[11] 3,567,090

| [72] | Inventor | Hermann Claar<br>Stuttgart-Hedelfingen, Germany |
|---|---|---|
| [21] | Appl. No. | 811,751 |
| [22] | Filed | Apr. 1, 1969 |
| [45] | Patented | Mar. 2, 1971 |
| [73] | Assignee | Eastman Kodak Company<br>Rochester, N.Y. |
| [32] | Priority | Oct. 10, 1968 |
| [33] | | Germany |
| [31] | | 1,802,215 |

[54] CINEMATOGRAPHIC APPARATUS
10 Claims, 4 Drawing Figs.

[52] U.S. Cl. ..................................................... 226/11,
226/54, 352/168, 226/108
[51] Int. Cl. ............................................................ B65h 25/00
[50] Field of Search ........................................... 226/11, 54,
63, 115, 108; 352/168, 169

[56] References Cited
UNITED STATES PATENTS

| 3,124,039 | 3/1964 | Anderson | 352/167X |
| 3,178,721 | 4/1965 | Kamp | 352/169 |

Primary Examiner—Allen N. Knowles
Assistant Examiner—Gene A. Church
Attorneys—Robert W. Hampton and William C. Dixon, III ABSTRACT: A cinematographic apparatus having a film transport claw engageable with film ahead of the film gage is provided with a drag claw beyond the film gate to automatically remove the trailing end portion of a projected film from the film gate. The drag claw becomes operative to engage the film, in response to movement of a film-sensing member disposed for contact with the film ahead of the film transport claw, only when film projection has been completed.

HERMANN CLAAR
INVENTOR.

HERMANN CLAAR
INVENTOR.
ATTORNEYS

CINEMATOGRAPHIC APPARATUS

BACKGROUND OF THE INVENTION

This invention relates to a cinematographic apparatus, particularly a cinematographic projector having a single claw which transport film through a film gate.

It is well known that the operating noise of a cinematographic apparatus, such as a cinematographic projector, is influenced considerably by the number and masses of its moving parts, particularly the parts of the film transport claw mechanism. In general, the noise intensity is proportional to the total mass moved. The smallest possible mass of a film transport claw mechanism is obtained by using a one-tooth film transport claw.

In a sprocketless projector in which the film transport claw is disposed in advance of the film gate, the film trailing end may remain in the film track after projection so that there is danger of its being damaged by the heat generated by the projection lamp. On the other hand, when the film transport claw is disposed after the film gate and accordingly is capable of pulling the film trailing end out of the gate after projection, there may arise difficulties in threading a new film because of the long threading path to the claw.

SUMMARY OF THE INVENTION

An object of the present invention is to provide a cinematographic projector of the type having a one-tooth film transport claw in which film is readily insertable for engagement by the claw before projection and is automatically removable from the film gate after projection. Another object of the invention is to provide such a projector with a minimum of complexity in design and operation, and at minimum cost of manufacture.

To meet these and other objects, the present invention provides, for use in a cinematographic apparatus in which film having a trailing end portion is movable from a first site through a film gate to a second site, the combination comprising means for engaging and advancing film between the first site and the gate and means for engaging and advancing film at the second site in response to movement of the film trailing end portion from the first site toward the second site. In the preferred embodiment of the invention, a film-sensing member is disposed for contact with film at the first site, the film-sensing member being movable from a first position in which it is in contact with the film when film is at the first site to a second position when film is not at the first site; a first film-moving member is disposed for engagement with the film between the first site and the gate, the first film-moving member being movable to advance the film; a second film-moving member is coupled to the film-sensing member and disposed for engagement with the film at the second site, the second film-moving member being movable into engagement with the film in response to movement of the film-sensing member from the first position to the second position, the second film-moving member being further movable to advance the film; and means, coupled to the second film-moving member and movable into engagement with the first film-moving member in response to movement of the film-sensing member from the first position to the second position, is provided for effecting film-moving motion of the second film-moving member in response to motion notion of the first film-moving member; whereby the film is moved by the second film-moving member in response to movement of the trailing end portion from the first site toward the second site.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

In the figures, the same parts appearing in more than one figure are designated by the same reference numerals.

DESCRIPTION OF THE PREFERRED EMBODIMENT

Because certain parts of cinematographic and related apparatus are well known, the following description is directed in particular to those elements forming, or cooperating directly with, the present invention, elements that are not specifically shown or described herein being understood to be selectable from those known in the art.

Figure 1:
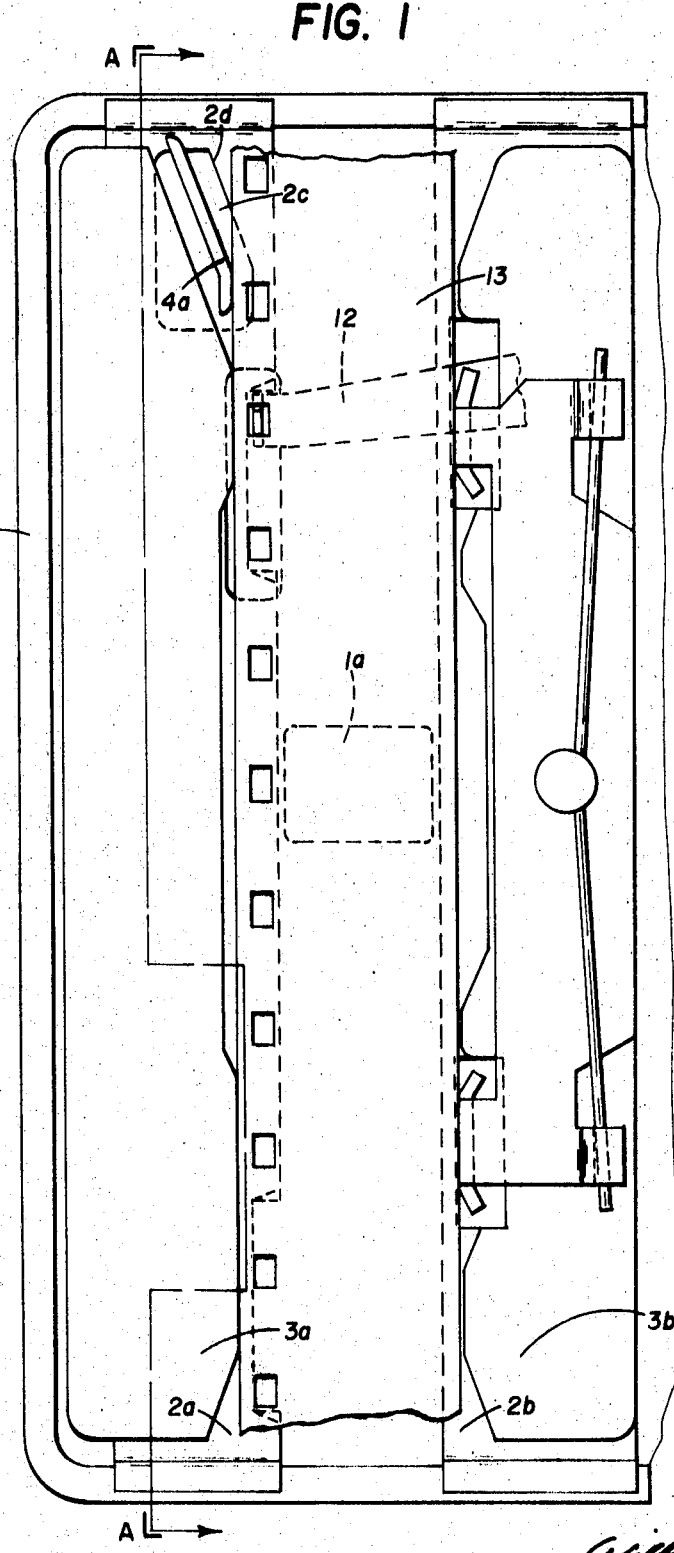
FIG. 1 illustrates the film track of a cinematrographic projector, as viewed from the objective lens, with the film pressure plate removed.
Figures 2, 3:
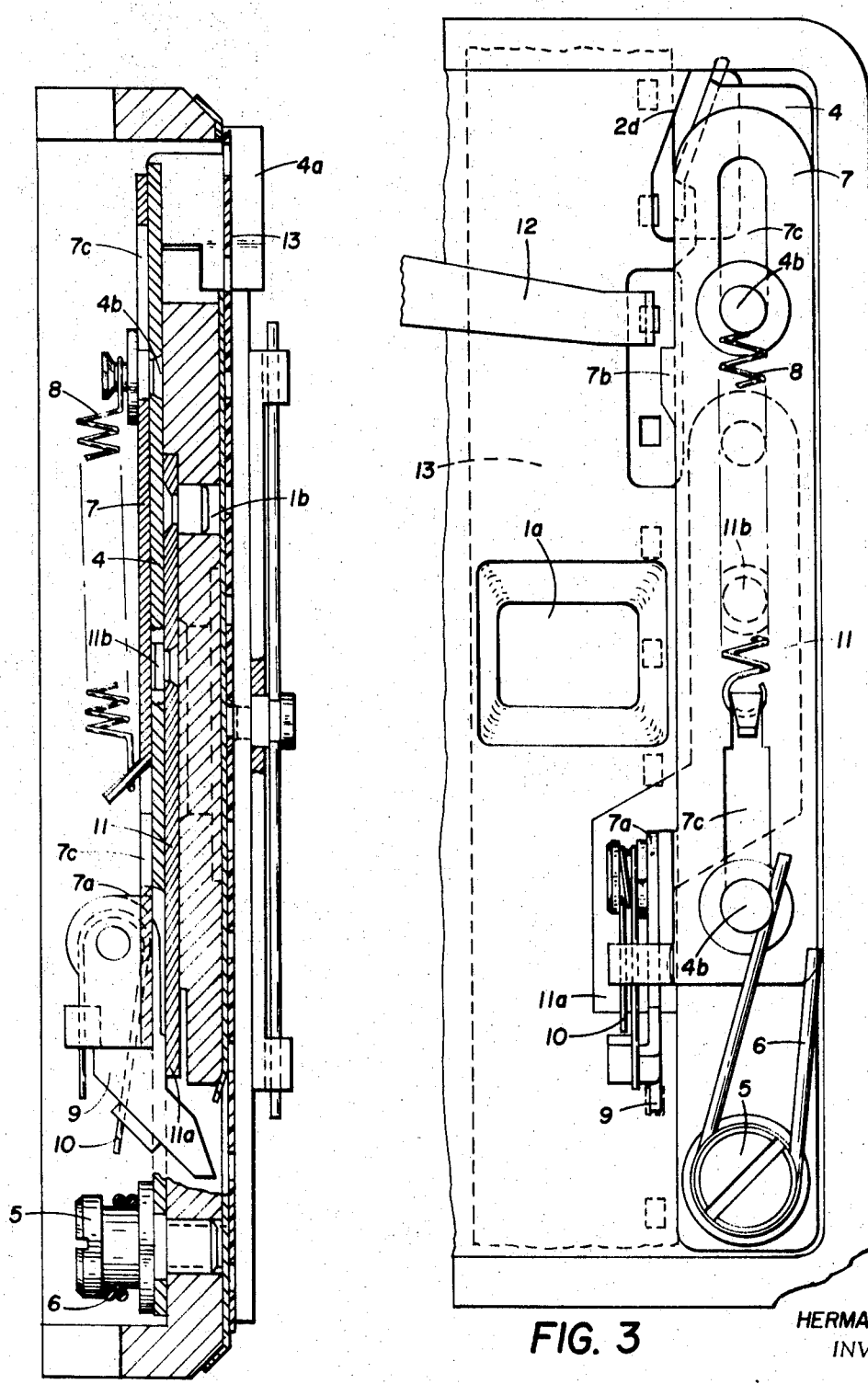
FIG. 2 is a section taken along line A–A of FIG. 1.
FIG. 3 illustrates the film track and the mechanism of the present invention in the projector of FIG. 1, as viewed from the projector lamp, when film is in the film track.

FIG. 1 shows a film track 1, including a film gate 1a, which has, on its side facing the objective lens, a pair of film support rails 2a, 2b and a pair of film guide rails 3a, 3b. Through a recess 2c in support rail 2a projects an inclined surface 4a of a lever 4 that is rotatably mounted on the projector frame by a shoulder screw 5, as shown in FIG. 2. A spring 6 urges lever 4, with its inclined surface 4a, toward a strip of film 13. Such movement of surface 4a is limited by an edge 2d of recess 2c. Upon insertion of film 13, which is intermittently advanced by a first film-moving member such as one-tooth film transport claw 12, actuated in a well-known manner by motor-driven cam means not described herein, inclined surface 4a is urged, against the biasing influence of spring 6, to the position shown in FIG. 3, in which surface 4a abuts an edge of film 13. Mounted or vertical sliding movement on lever 4, by means of a pair of pins 4b riding in a pair of slots 7c, is a slide member 7 which is biased upwardly by a spring 8. Rotatably mounted on a bent portion 7a of slide member 7 is a second film-moving member such as one-tooth drag law 9, which is urged toward film 13 by a spring 10 but prevented from contacting film 13 by an end portion 11a of a support lever 11 rotatably mounted on the projector frame as at 1b. Support lever 11 is rotatably coupled to lever 4 by a rivet 11b.

Figure 4:
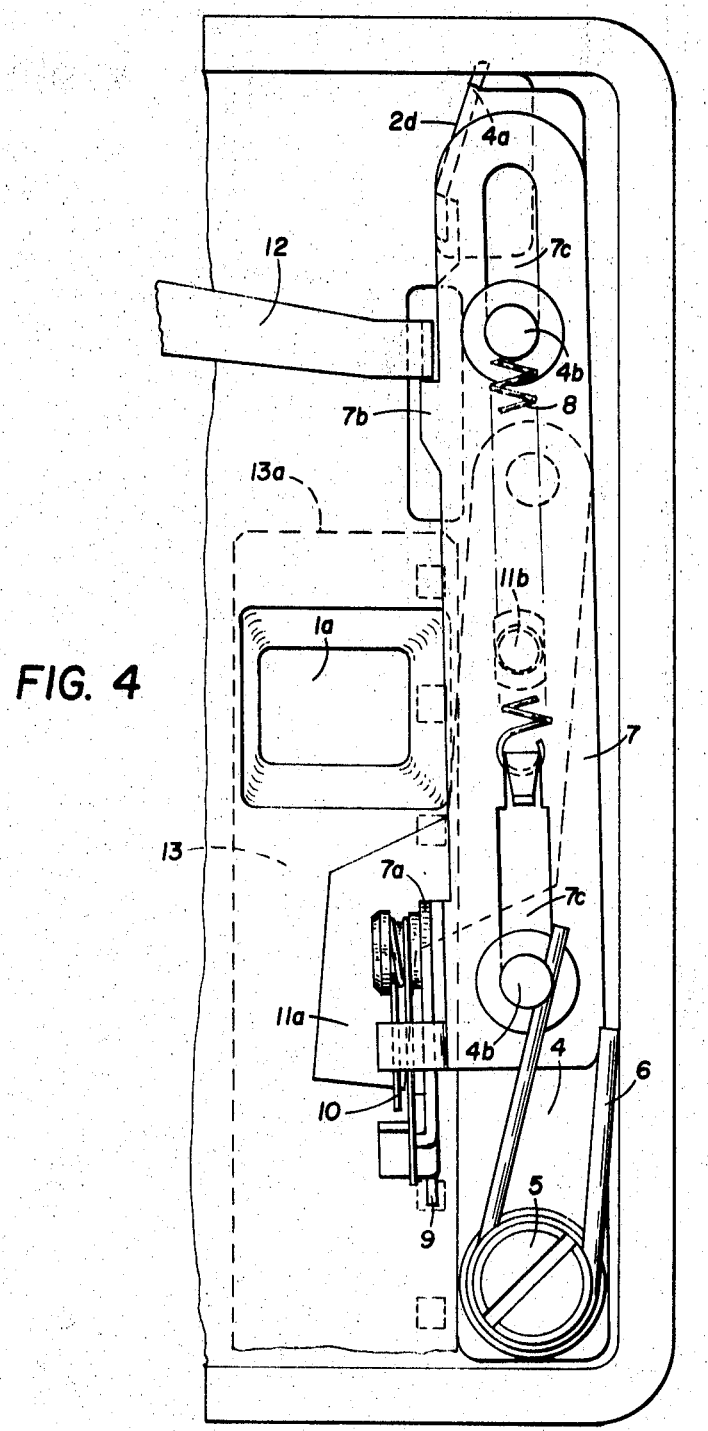
FIG. 4 illustrates the film track and the mechanism of the present invention in the projector of FIG. 1, as viewed from the projection lamp, when the film trailing end is in the film gate.

As soon as the trailing end portion 13a of film 13 has passed inclined surface 4a of lever 4, lever 4 is rotated counterclockwise, as viewed in FIGS. 3 and 4, under the biasing influence of spring 6, until surface 4a abuts edge 2d of recess 2c. By means of the coupling rivet 11b and the rotatable mounting of lever 11 at 1b of the projector frame, lever 11 is rotated clockwise, as viewed in FIGS. 3 and 4, its end portion 11a thereby being moved away from drag claw 9, as shown in FIG. 4. Drag claw 9 is then free to engage a perforation in film 13 under the biasing influence of spring 10.

Slide member 7 is provided with a nose 7b which has been moved into the film track by lever 4. As a result, nose 7b enters the path of movement of, and is engaged by, claw 12, and thereby transmits the film-moving motion of claw 12, through slide member 7 and drag claw 9, to film 13. The biasing influence of spring 8 ensures that slide member 7 and drag claw 9 always follow the return motion of claw 12, during which return motion drag claw 9 slides over film 13 and engages the next perforation in preparation for the next film-moving motion. This film-moving operation is repeated until trailing end portion 13a has been moved past the effective range of drag claw 9, so that film 13, which is then outside the clamping range of the film pressure plate (not shown) at film gate 1a, is free to be rewound upon the film-supply reel (also not shown).

With the apparatus in continued operation, slide member 7 continues to be moved up and down by spring 8 and claw 12 until a new film 13 is inserted, by which inclined surface 4a of lever 4 is pushed aside and the nose 7b of slide member 7 is moved out of the path of movement of claw 12 so that the condition shown in FIG. 3 is reestablished.

With the mechanism of the present invention, drag claw 9 is disengaged from film 13 practically throughout film projection, so that transport claw 12 can operate without the additional load that would otherwise be imposed by claw 9. As a result, the operating noise is kept extremely low. The insertion of a new film is very simple, for it requires no more than introducing the leading end portion of the new film to a point short of film gate 1a for engagement by film transport claw 12. And the film is automatically removed from gate 1a by drag claw 9 when film projection has been virtually completed, thereby eliminating the danger of damaging the trailing end portion of the film by heat from the projection lamp.

The invention has been described in detail with particular reference to the preferred embodiment thereof, but it will be understood that variations and modifications can be effected within the spirit and scope of the invention.

I claim:

1. For use in a cinematographic apparatus in which film having a trailing end portion is movable from a first site through a film gate to a second site, the combination comprising:
   a. means for engaging and advancing film between the first site and the gate; and
   b. means for engaging and advancing film at the second site in response to movement of the film trailing end portion from the first site toward the second site.

2. In a cinematographic apparatus in which film having a trailing end portion is movable from a first site through a film gate to a second site in response to film-moving motion of first means for engaging and advancing film between the first site and the gate, the improvement comprising:
   a. means for sensing the presence and absence of film at the first site, said film-sensing means being movable from a first position in which it senses the presence of film at the first site to a second position in which it senses the absence of film at the first site; and
   b. second means for engaging and advancing film at the second site in response to movement of said film-sensing means from said first position to said second position;
   whereby film is advanced by said second means in response to movement of the film trailing end portion from the first site toward the second site.

3. In a cinematographic apparatus in which film having a trailing end portion is movable from a first site through a film gate to a second site in response to film-moving motion of a first film-moving member disposed for engagement with the film between the first site and the gate, the improvement comprising:
   a. a film-sensing member for contacting the film at the first site, said film-sensing member being movable from a first position in which it is in contact with the film when the film is at the first site to a second position when the film is not at the first site;
   b. a second film-moving member coupled to said film-sensing member and disposed for engagement with the film at the second site, said second film-moving member being movable into engagement with the film in response to movement of said film-sensing member from said first position to said second position, said second film-moving member being further movable to advance the film; and
   c. means, coupled to said second film-moving member and movable into engagement with the first film-moving member in response to movement of said film-sensing member from said first position to said second position, for effecting film-moving motion of said second film-moving member in response to film-moving motion of the first film-moving member;
   whereby the film is moved by said second film-moving member in response to movement of the film trailing end portion from the first site toward the second site.

4. The improvement claimed in claim 3, wherein each of said first and second film-moving members includes a one-tooth film-engaging claw.

5. The improvement claimed in claim 3 further comprising means for biasing said film-sensing member toward said second position, whereby said film-sensing member is moved by said biasing means from said first position to said second position in response to movement of the film trailing end portion from the first site toward the second site.

6. The improvement claimed in claim 3 wherein the second film-moving member is movable from a first location in which it is not engaged with the film to a second location in which it is engaged with the film at the second site; and further comprising means engageable with said second film-moving member for retaining said second film-moving member in said first location when said film-sensing member is in said first position, said retaining means being disengageable from said second film-moving member to permit movement of said second film-moving member from said first location in response to movement of said film-sensing member from said first position to said second position, and means for biasing said second film-moving member toward said second location to effect movement of said second film-moving member from said first location to said second location in response to movement of said film-sensing member from said first position to said second position.

7. The improvement claimed in claim 6 wherein said retaining means is rotatably mounted on the apparatus and coupled to said film-sensing member for rotational movement out of engagement with said second film-moving member when said film-sensing member is moved from said first position to said second position.

8. The improvement claimed in claim 3 wherein said effecting means is coupled to said film-sensing member for movement with said film-sensing member into engagement with the first film-moving member when said film-sensing member is moved from said first position to said second position, said effecting means being movable relative to said film-sensing member by the first film-moving member, when the first film-moving member is engaged with said effecting means, to effect film-moving motion of said second film-moving member in response to film-moving motion of the first film-moving member.

9. The improvement claimed in claim 3 wherein said film-sensing member is rotatably mounted on the apparatus for rotational movement from said first position to said second position; wherein said second film-moving member is rotatably mounted on said effecting means for rotational movement into engagement with the film; wherein said effecting means is slidably mounted on said film-sensing member for transmitting film-moving motion of the first film-moving member to said second film-moving member.

10. The improvement claimed in claim 9 further comprising means for biasing said film-sensing member toward said second position; means for biasing said second film-moving member into engagement with the film; and means for biasing said effecting means in a direction opposite to that in which said effecting means transmits film-moving motion.